United States Patent [19]

Hutchins et al.

[11] 3,993,973

[45] Nov. 23, 1976

[54] UNDERWATER TRANSIENT SOUND GENERATOR HAVING PRESSURE COMPENSATING FILLET

[75] Inventors: Roger Hutchins; Tony William Orton, both of Toronto; Nguyen Thai, Don Mills, all of Canada

[73] Assignee: Huntec (70) Limited, Scarborough, Canada

[22] Filed: Mar. 17, 1975

[21] Appl. No.: 559,299

[52] U.S. Cl. .............................. 340/8 PC; 340/10; 340/12 R; 340/13 R; 340/14
[51] Int. Cl.² ........................................ H04R 13/02
[58] Field of Search .......... 340/8 PC, 8 R, 14, 12 R, 340/13 R

[56] References Cited
UNITED STATES PATENTS

| | | | |
|---|---|---|---|
| 2,906,993 | 9/1959 | Steinberger | 340/8 PC |
| 3,018,466 | 1/1962 | Harris | 340/8 |
| 3,336,573 | 8/1967 | Gallaway et al. | 340/17 |
| 3,764,966 | 10/1973 | Abbagnaro | 340/14 |

*Primary Examiner*—Brooks H. Hunt
*Attorney, Agent, or Firm*—Rogers, Bereskin & Parr

[57] ABSTRACT

An underwater sound generator having a planar piston which is repelled by energizing a coil, to create a pressure pulse. The pressure at the rear face of the piston is made to track the pressure at the piston front face by providing a rear compressible air volume which is connected by a bleed aperture to the non-compressible air volume at the rear face of the piston. The compressible volume is defined by a diaphragm extending across a fillet having a shallow spherically concave rear surface. As the depth of the generator increases, the diaphragm moves towards the fillet, compressing the air and effectively equalizing the pressure across the piston. In the limit the diaphragm is pressed against the fillet, with a minimum of tension, reducing the compressible volume to a minimum.

6 Claims, 5 Drawing Figures

UNDERWATER TRANSIENT SOUND GENERATOR HAVING PRESSURE COMPENSATING FILLET

This invention relates to an underwater transient sound generator.

Underwater transient sound generators are used extensively in underwater surveying, to determine the profile of the sub-bottom terrain. In order to obtain useful results, it is desirable than uniform pressure pulses each having a broad flat frequency spectrum be produced. If such pulses are available to illuminate the sea bed, then the return signal can be viewed through narrow band filters at various selected frequencies, to determine the structure of the sea bed.

The present invention is concerned with an underwater transient sound generator of the kind which employs a piston plate which is repelled outwardly into the water by means of eddy currents induced in the plate by a coil. As the piston moves forward, it produces a positive pressure pulse in the water. In such devices, as the location of the device in the water is changed, the ambient pressure on the front face of the piston changes. This causes a variation in the positive pressure pulse produced by the piston. The variation is highly undesirable since it interferes with the interpretation of the results of the survey. If the ambient pressure at the rear face of the piston could be made to track (i.e. change with) the ambient pressure at the front face of the piston, then the variation of the output pulses due to depth changes would be eliminated. To date, however, prior art devices have not been able to achieve this result.

The present invention provides means for improved tracking of the pressure at the rear face of the piston with the pressure at the front face of the piston. To this end the invention provides, in a preferred embodiment, an underwater transient sound generator comprising:

1. an electromagnetic coil,
2. a support member defining a rear support for said coil,
3. a piston,
4. means locating said piston in front of said coil for movement between a normal position adjacent said coil and a forward position spaced in front of said coil,
5. means defining with said piston a small watertight non-compressible gas space at the rear of said piston when said piston is in said normal position,
6. means for energizing said coil to displace said piston to said forward position,
7. bias means for returning said piston to said normal position upon removal of such energization from said coil,
8. a rigid fillet non-movably located behind said support member, said fillet having a peripheral rim and a smooth shallow concave rearwardly opening surface, sloping smoothly inwardly from said rim, said surface being substantially free of abrupt discontinuities,
9. a rear diaphragm lying over said rim and extending across said rear surface of said fillet and defining between said diaphragm and said rear surface a watertight compressible gas space, said compressible gas space being substantially larger than said non-compressible gas space,
10. said support member including an aperture therein communicating between said compressible and non-compressible spaces, said aperture forming part of said non-compressible space, so that when said generator is lowered within a body of water and gas from said compressible space is compressed into said non-compressible space, said rear diaphragm is urged toward said fillet and may adopt the contour of said concave surface.

Further objects and advantages of the invention will appear from the following description, taken together with the accompanying drawings, in which.

Figure 1:
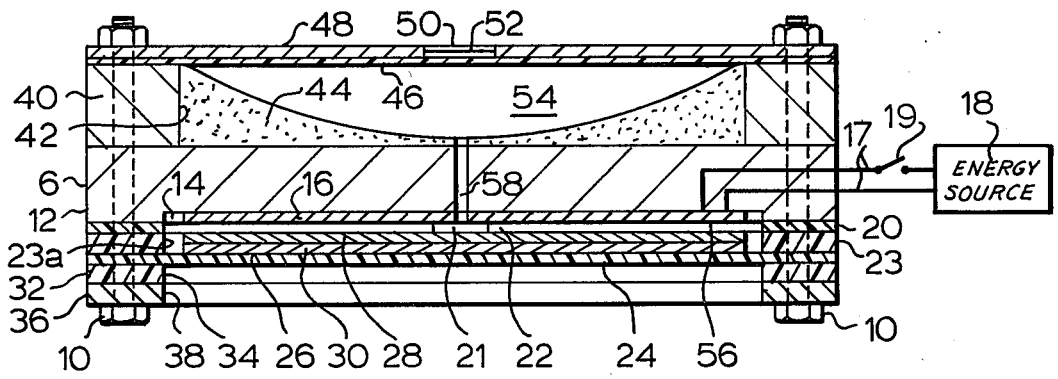
FIG. 1 is a sectional view of a preferred embodiment of the invention.
Figure 2:
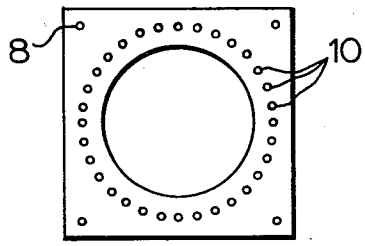
FIG. 2 is a front view of the device of FIG. 1.
Figure 3:
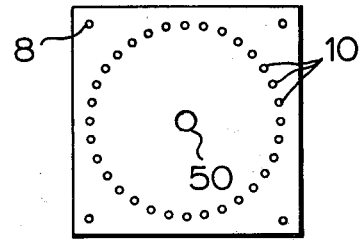
FIG. 3 is a rear view of the device of FIG. 1.

Reference is first made to FIGS. 1 to 3 which show a preferred transient underwater sound generator 2 according to the present invention. The generator 2 includes a square relatively thin support member 6, made of high strength very stiff material. A preferred material is concrete reinforced with carbon fibres. The support member 6 carries a series of elements now to be described, and which are secured thereto by corner nuts and studs 8 and by a circular row of closely spaced nuts and studs 10.

Located in the front face of the support member 6 is a rim 12 which defines the edge of a shallow circular recess or opening 14. Located within the opening 14 is a generally planar electromagnetic coil 16. The coil 16, which is secured to the front of support member 6 e.g. by adhesive, may be electrically energized, when desired, via leads 17 from energy source 18, by closing switch 19.

Figure 4:
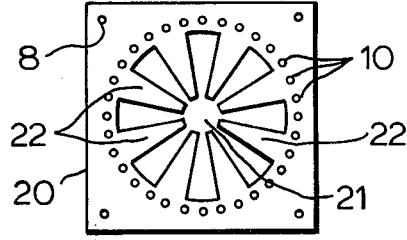
FIG. 4 is a plan view of a spacer gasket of the FIG. 1 device.

Mounted in front of gasket 12 is a square spacer gasket 20 having a circular interior opening 21 (see also FIG. 4) with spacer fingers 22 projecting into the opening 21. The spacer gasket 20 serves a purpose to be described.

Mounted in front of spacer gasket 20 is a further spacer gasket 23 having a circular opening 23a.

Mounted in front of the spacer gasket 23 is a square diaphragm 24 having a circular piston 26 secured to its inner surface. The piston 26 is conventional and may typically be formed of thin copper plate 28 having a stiffening material such as honeycomb aluminum 30 secured to its front face. The piston 26 is secured to the diaphragm 24 by a suitable adhesive. The diaphragm 24 is sealed in position by a square gasket 32 having a circular opening 34 therein for the piston, and by a square clamp plate 36 having a circular opening 38 matching that of the other members described. The entire assembly is held clamped together by the nuts and studs 8, 10.

At the rear of the generator 2 there is located a spacer plate 40, square in outline but having a circular opening 42 of approximately the same diameter as that of the piston 26. Located within the opening 42 is a fillet 44. The rear surface of fillet 44 is circular in plan and spherically concave in cross-section, opening rearwardly from the piston 26. The rear surface of the fillet 44 is covered by an elastic diaphragm 46 which extends over the rear surface of the spacer plate 40. The diaphragm 46 is held in position by a clamping plate 48 which in turn is secured (together with the spacer plate 40) by the nuts and studs 8, 10.

Water is admitted to the rear face of the diaphragm 46 via a small opening 50 in the clamping plate 48. A screen 52 is secured in the opening 50 (by a retainer, not shown) to filter water admitted through opening 50.

It will be seen that in the normal condition of the device, the rear diaphragm 46 and the fillet 44 define between them a rear air (or gas) space 54. In addition, the support member 6 and the piston 26 define between them a front air (or gas) space 56, which when the piston is in its rearmost position is limited to the spaces between the fingers 22 of the spacer gasket 20. (The fingers 22 are normally very thin, e.g. about 1/32 inch thick.) The piston is normally urged to its rearmost position by the elasticity of diaphragm 24. The front and rear spaces, 56, 54 are connected via a very small diameter passage 58 in the support member 6, for a purpose which will now be explained.

Figure 5:
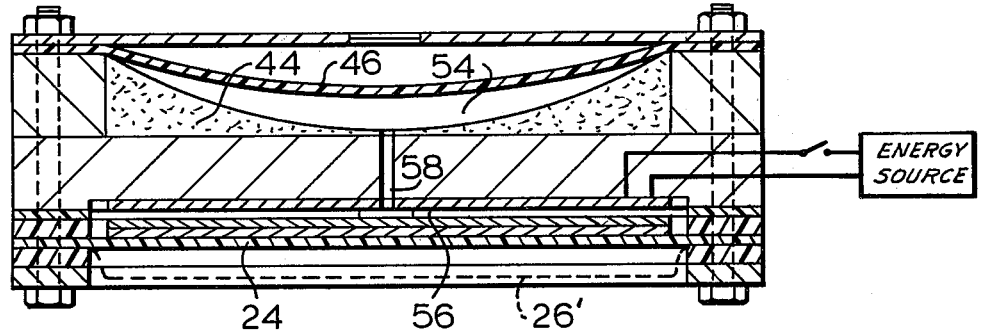
FIG. 5 is a view similar to that of FIG. 1 but showing the diaphragm of FIG. 1 in a partly deflected condition.

In the operation of the device, when its position in the water is lowered, the ambient water pressure at the front face of the piston 26 (transmitted through diaphragm 24) increases. It is desirable to have the ambient pressure at the rear face of the piston increase to an equal extent. As shown in FIG. 5, under these increased pressure conditions, the rear diaphragm 46 deforms, reaching the position shown in FIG. 5 when the pressure becomes high enough, and eventually lying against the rear surface of fillet 44. Because of the curved shape of fillet 44, it is found that the pressure required to deform the rear diaphragm 44 is minimized, and hence most of the increased pressure remains available to compress the air spaces 54, 56 and passage 58, and hence to act against the rear of the piston. If the fillet 44 were not present, in which case the rear diaphragm 46 would have to deform in a U-shape, the diaphragm would absorb a significant part of the total pressure available, and the pressure difference between the front and rear faces of the piston would become vairable with depth to an unacceptable degree. The substantial pressure then required to deform diaphragm 46 could be reduced by appropriate selection of material and thickness for diaphragm 46, but since the diaphragm 46 must be tough and durable (it must withstand shock loads and very high pressure pulses, repeated at frequent intervals), it cannot be made light enough to obviate the problem in this manner.

When the generator 2 is pulsed, by closing switch 19, a very high pulse of current (e.g. 10,000 amperes) energizes coil 16, creating eddy currents in the piston 26. The magnetic fields created by the piston and coil repel the piston away from the coil suddenly and powerfully. The forward displacement of the piston (to a position indicated by dotted line 26' in FIG. 5) creates a sharp underwater positive pressure pulse radiated in the forward direction. Forward travel of the piston 26 is limited by the elasticity of the front diaphragm 24. The fingers 22 of the spacer gasket 20, which is conventional, prevent the piston from being forced tightly against the coil in the rest position of the piston and facilitate outward movement of the piston. The spaces between the fingers 22 permit air circulation at the rear face of the piston.

Because the piston 26 moves forward very rapidly (within about 200 microseconds) and because the diameter of passage 58 is very small (typically about 1/16 inch), the viscosity of the air effectively prevents the air in the rear space 54 from rushing forwardly into the front space 56 at this time. This reduces the amplitude of any negative pressure pulse radiated from the rear of the unit. The diaphragm 24 begins to move the piston 26 back to its rest position before an appreciable amount of air can bleed through the passage 58.

The volume of the rear space 54 (which may be considered to be a compressible volume) will depend on the depth range through which the unit is to be moved and upon the total volume of non-compressible air present in the unit. The non-compressible air volume is made up of the front air space 56 plus the volume of the passage 58. In a typical unit made according to the invention, the total non-compressible volume was 8 cubic inches, and the total compressible volume (i.e. the volume between fillet 44 and rear diaphragm 46) was 390 cubic inches. This permitted a compression of nearly 49 atmospheres before the compressible volume had vanished, at which time diaphragm 46 lay against the fillet 44 (ignoring losses in the diaphragm). Hence this permitted operation from the water surface down to a depth of about 1600 feet.

It will be seen that the non-compressible volume should be kept as small as possible. This is because if the air pressure at the rear of the piston is to track the ambient pressure when the unit is deeply submerged, then sufficient air must be present in the compressible volume when the unit is at the surface, so that when the unit is submerged, such air will fill the non-compressible volume to the required pressure. If the non-compressible volume is large, then the compressible volume must be large at the surface, creating higher manufacturing cost, more weight, and more difficult handling. The fingers of the spacer gasket 20 should therefore be kept thin, and the diameter of passage 58 should be kept small (just sufficient so that air can bleed from the rear space to the front space under static conditions).

Although various curved shapes may be used for the fillet 44 (e.g. hyperbolic, parabolic, or smoothly non-uniform), a spherical shape is preferred since this shape is simple to manufacture, reduces losses in the rear diaphragm, and reduces the likelihood of dead air space. It will be appreciated that if, for example, the fillet were shaped so that at 48 atmospheres there were 5 cubic inches of dead air space between it and the rear diaphragm, then for proper compensation there should be 5 × 48 = 240 cubic inches of compressible air in the rear air space at the surface to fill those five cubic inches of dead air space. The spherical shape of the fillet helps to minimize dead air space. It is also preferred, as shown, that the rim of the fillet be rounded, as indicated at 60 in the drawings. The curvature reduces tension at the side edges of the rear diaphragm 46 and also reduces chaffing of the diaphragm.

In a typical unit made according to the invention, having the compressible and non-compressible volumes indicated above, the piston diameter, and the chord diameter of the fillet 44, were both 20 inches; the spherical diameter of the fillet 44 was 44 inches, and the radius of curvature of the curved fillet edge 60 was 1 inch. The depth of the fillet 44 was 2.75 inches, resulting in a shallow rear opening having a chord diameter to depth ratio of about 7.27 to 1. Preferably this ratio is not made less than about 5 to 1.

Preferably the fillet 44 is made of acoustically lossy material, such as micro balloons (tiny glass or plastic spheres containing air and mixed in a binding material), or soft polyurethane, rubber, or if desired, concrete. The use of such material helps to reduce radiation from the rear of the device.

It will be appreciated that the piston 26 and coil 16 need not be planar but may assume any appropriate shape.

What I claim is:

1. An underwater transient sound generator comprising:
   1. an electromagnetic coil,
   2. a support member defining a rear support for said coil,
   3. a piston,
   4. means locating said piston in front of said coil for movement between a normal position adjacent said coil and a forward position spaced in front of said coil,
   5. means defining with said piston a small watertight non-compressible gas space at the rear of said piston and said support member when said piston is in said normal position,
   6. means for energizing said coil to displace said piston to said forward position,
   7. bias means for returning said piston to said normal position upon removal of such energization from said coil,
   8. a rigid fillet non-movably located behind said support member, said fillet having a peripheral rim and a smooth shallow concave rearwardly opening surface sloping smoothly inwardly from said rim, said surface being substantially free of abrupt discontinuites,
   9. a rear diaphragm lying over said rim and extending across said rear surface of said fillet and defining between said diaphragm and said rear surface a watertight compressible gas space, said compressible gas space being substantially larger than said non-compressible gas space,
   10. said support member including an aperture therein communicating between said compressible and non-compressible spaces, said aperture forming part of said non-compressible space, so that when said generator is lowered within a body of water and gas from said compressible space is compressed into said non-compressible space, said rear diaphragm is urged toward said fillet and may adopt the contour of said concave surface.

2. Apparatus according to claim 1 and including a rear clamping plate covering said rear diaphragm and having a small opening therein to admit water to said rear diaphragm.

3. Apparatus according to claim 2 wherein said concave surface is spherical in contour.

4. Apparatus according to claim 3 wherein the rim of said fillet is curved in a direction opposite to the curvature of the remainder of said fillet.

5. Apparatus according to claim 1 wherein the chord diameter to depth ratio of said fillet is at least five to one.

6. Apparatus according to claim 1, wherein said fillet is formed from a material having a high acoustical loss.

* * * * *